United States Patent [19]
Staron et al.

[11] Patent Number: 4,811,814
[45] Date of Patent: * Mar. 14, 1989

[54] MEASURING DEVICE FOR A SEISMIC PROFILE WITHIN A WELL-BORE

[75] Inventors: Philippe Staron, Mennecy; Pierre Gros, Buc, both of France

[73] Assignee: Societe Nationale Elf Aquitaine, Courbevoie, France

[*] Notice: The portion of the term of this patent subsequent to Aug. 11, 2004 has been disclaimed.

[21] Appl. No.: 9,586

[22] Filed: Jan. 29, 1987

Related U.S. Application Data

[63] Continuation of Ser. No. 666,840, Oct. 31, 1984, abandoned.

[30] Foreign Application Priority Data

Nov. 9, 1983 [FR] France ................. 83 17788

[51] Int. Cl.$^4$ ............... G01V 1/00; G01V 1/40
[52] U.S. Cl. ................... 181/108; 181/102; 181/401; 367/911
[58] Field of Search ............ 33/1 HH, 1 PT; 73/151, 73/152; 181/102, 103, 104, 105, 106, 401, 108; 166/65.1, 66, 242; 175/325, 326; 267/1.5, 182; 367/25, 26, 27, 28, 29, 30, 31, 32, 911, 912, 86

[56] References Cited

U.S. PATENT DOCUMENTS

| Re. 31,607 | 6/1984 | Vogel et al. | 367/35 |
|---|---|---|---|
| 2,963,641 | 12/1960 | Nanz | 181/102 X |
| 3,475,722 | 10/1969 | White | 367/911 X |
| 3,542,150 | 11/1970 | Youmans | 181/104 |
| 3,626,364 | 12/1971 | Simon et al. | 73/649 |
| 3,648,515 | 3/1972 | Youmans | 181/102 |
| 3,794,976 | 2/1974 | Mickler | 181/104 |
| 3,798,966 | 3/1974 | Planche | 73/151 |
| 3,883,841 | 5/1975 | Norel et al. | 367/25 |
| 3,978,939 | 9/1976 | Troviller | 181/104 |
| 4,056,004 | 11/1977 | Roesner | 73/151 |
| 4,325,259 | 4/1982 | Willertz | 73/653 |
| 4,578,785 | 3/1986 | Gelfand | 367/911 X |
| 4,686,653 | 8/1987 | Staron et al. | 181/102 X |

FOREIGN PATENT DOCUMENTS

| 649113 | 9/1962 | Canada | 181/104 |
|---|---|---|---|
| 1169871 | 1/1959 | France | |
| 2172808 | 10/1973 | France | |
| 2530345 | 1/1984 | France | |
| 586410 | 12/1977 | U.S.S.R. | 181/102 |
| 711514 | 1/1980 | U.S.S.R. | 181/102 |

Primary Examiner—Brian S. Steinberger
Attorney, Agent, or Firm—Holman & Stern

[57] ABSTRACT

A measuring device for a seismic profile within a well-bore includes resilient members such as springs which are flexible in at least two directions and are interposed between a geophone and a rigid arm connected to a measuring-tool body for applying the geophone against the wall of the well-bore during each detection of seismic waves generated at the ground surface. The elasticity of the resilient members is at least equal to the elasticity of the subsurface stratum through which the well-bore extends. The resonance frequency of the mass of the geophone with the resilient members is equal at a maximum to the resonance frequency defined by the geophone mass and elasticity of the subsurface stratum.

11 Claims, 2 Drawing Sheets

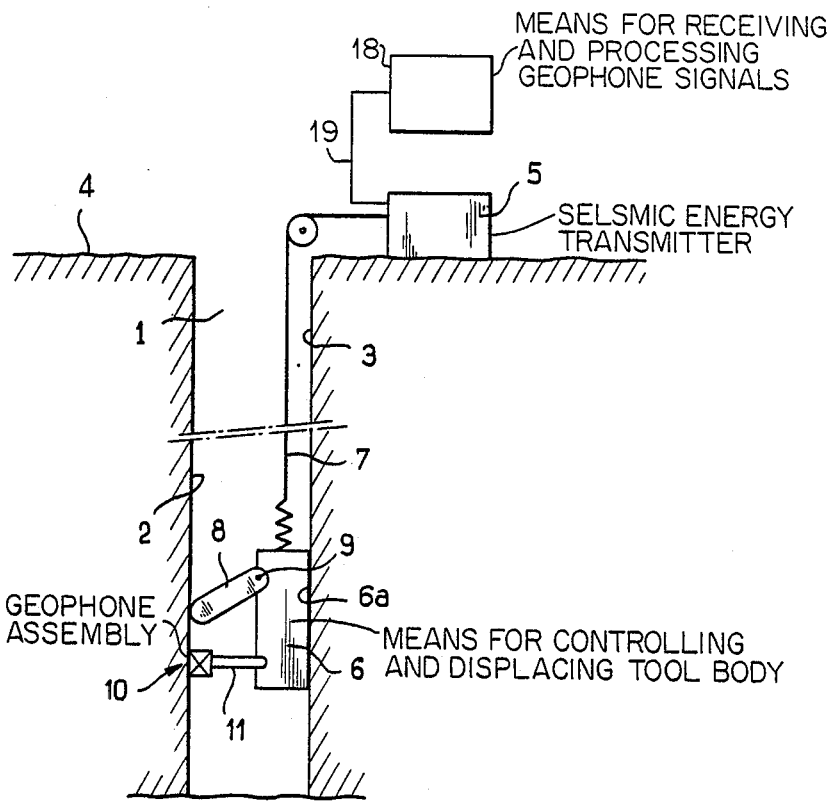
FIG_1
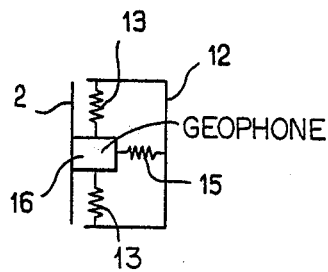
FIG_2
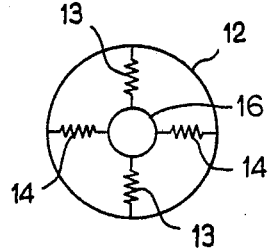
FIG_3
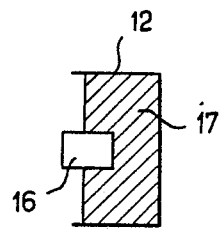
FIG_4

MEASURING DEVICE FOR A SEISMIC PROFILE WITHIN A WELL-BORE

This is a continuation of application Ser. No. 666,840 filed Oct. 31, 1984, now abandoned.

BACKGROUND OF THE INVENTION

1. Field of the Invention

The present invention relates to a measuring device for a vertical seismic profile within a well-bore.

2. Description of the Prior Art

Measurements taken in a well-bore usually fall into two main classes. The first class is known as ultrasonic measurement. This type of measuring operation is performed by means of a tool which is lowered into the well-bore at the end of a cable. The tool comprises one or a number of transmitters and one or a number of receivers in addition to the means required for turning-on the transmitters at suitable moments, and means for transmitting the signals received by the receivers to the ground surface for the purpose of recording and processing said signals.

Ultrasonic measurement makes use of transmitters which are capable of transmitting high-frequency sound signals within the range of a few thousand hertz to several tens of thousands of hertz into the fluid which fills the well. The sound signals propagate within the fluid in the form of compression waves in which the associated physical parameters are essentially the pressure and velocity of particles.

It should be noted that waves of different types may be generated as the measuring tool comes into contact with heterogeneous formations around the tool and especially as this latter comes into contact with the wall of the bore-hole. However, ultrasonic measurements are usually performed with a view to ensuring that waves other than compression waves are reduced or highly attenuated and that errors are consequently not liable to occur when processing compression waves of interest.

In the majority of instances, ultrasonic measurements are performed during displacement of the tool, that is to say when the tool is moving within the well-bore. The relatively low speed of the tool within the bore (a few meters per minute) does not give rise to parasitic noise in the receivers.

The receivers employed (also known as transducers) are hydrophones which in fact consist of vibrational pressure sensors or so-called pickups. The waves received by the pickups receive the compression waves defined earlier and possibly any parasitic waves derived from the compression waves and generated by heterogeneous formations. The time-duration of each useful signal received by the pickup after each transmission is of the order of a few milliseconds, taking into account the frequency of the signals transmitted.

It is very important to note that measurement of a compression wave received by the pickup, which is a measurement of vibrational pressure, makes it possible to obtain only a scalar quantity, that is to say without orientation in space.

Many different types of tools for ultrasonic measurement are in existence at the present time. These tools secure freedom from waves which propagate within the actual mass of the tool and make it possible to form acoustic paths having cylindrical symmetry about the axis of the well-bore.

The second type of measurement relates to a vertical seismic profile, an oblique seismic profile or else a seismic well-profile, this second type of measurement being completely different from the first type recalled earlier by way of reference.

In fact, when prospecting for petroleum, for example, it is necessary to determine the nature and characteristics of subsurface strata which surround the bore-hole. To this end, seismic energy is generated at the ground surface and not within the bore-hole by means of a detonation (explosive charge), a suitable impact (caused by a falling weight), or else a vibration in contact with the ground surface. This seismic energy produces waves which propagate within the subsurface strata and which are received by geophones and no longer by pickups. The geophones are designed in the form of "velocimeters" which are sensitive to vibrational velocity and placed either on the ground surface, in which case they receive the waves reflected and/or refracted by the different subsurface strata, or within the drill-hole but in this case they must imperatively be in direct contact with the wall of the drill-hole in contrast to ultrasonic measurement in which pickups have to be within the fluid which fills the bore-hole.

In all cases, geophones or velocimeters are sensitive to vibrational velocity and must permit determination of all types of seismic waves generated by the energy emitted at the surface. In fact, direct mechanical coupling between the emitting means and the ground surface gives rise to all types of waves since the seismic energy emitted necessarily encounters heterogeneous formations in the subsurface under exploration. In consequence, it can no longer be considered sufficient to receive one particular wave among others on one or a number of geophones or to obtain a scalar quantity. On the contrary, the geophones must necessarily receive all the waves including compression or transverse waves and in all directions in which they propagate in order that all possible directions of vibrational velocities may accordingly be distinguished at the time of processing.

Taking into account the transmission means employed and the object to be achieved, frequencies are transmitted within the range of a few hertz to a few hundreds of hertz (for example within the range of 5 to 500 Hz) and the time-duration of the useful signal is of the order of a few seconds.

Finally, in contrast to ultrasonic measurement, it is worthy of note that, in the second type of measurement considered and during upward travel of the tool, the measurements are performed while the geophone or geophones remain stationary with respect to the bore-hole wall and are applied against the wall in order to ensure satisfactory coupling.

Subsequent processing of the signals received at the geophones makes it possible to obtain useful information on the subsurface strata traversed by the waves from the ground surface to the geophones.

A number of different techniques may be employed. It is possible to place geophones at intervals (which may or may not be uniform) along the bore-hole and to process the data on the different geophones. It is also possible to employ a tool which comprises a geophone and which is stopped at each appropriate level of the bore-hole during each measurement.

In the second type of measurement, the major difficulty arises from the fact that no method has yet been found for obtaining satisfactory coupling of the geophone with the wall of the bore-hole.

One attempt has been made to overcome the difficulty and has been described in French patent No 1,169,871. The device of the prior art comprises a tool having a cylindrical element which serves to maintain a geophone assembly at the desired height within the well-bore and prevents said geophone assembly from rotating with respect to the tool by means of a key connection. The geophone assembly comprises two arcuate blade-springs disposed symmetrically on each side of the tool which is centered within the well-bore. Said blade-springs are connected to each other by means of pivots mounted on an intermediate element which is connected to the tool body. One of the blade-springs is applied against the wall of the bore-hole while the other blade-spring is adapted to carry substantially at the vertex of its arch a shoe which is pivotally mounted at the center of the spring. The outer face of said shoe is in contact with the wall opposite to that on which the first spring is applied. A geophone is then fixed on the inner face of the shoe and is connected by means of a conductor cable t the amplification equipment located within the tool body.

A tool of this type constitutes a substantial improvement upon the technique of geophones placed on the ground surface or distributed along the wall of the bore-hole. But it fails to provide a complete solution to the problem of direct coupling with the wall of the bore-hole.

There is in fact no direct contact of the geophone with the wall of the bore-hole since it is mounted on the internal face of the shoe. Although the shoe is perfectly rigid and the tension of the springs prevents the shoe from sliding along the wall of the bore-hole during a measurement operation, it is nevertheless a fact that the parasitic waves which propagate within the tool body, which are produced by the transmitted energy and which also propagate within the blade-springs and the shoe are received by the geophone. This arises from the fact that the tool, the shoe and to a lesser degree the blade-springs are rigid.

A further disadvantage is that, in the case of a given measurement, the geophone is oriented in only one direction and is therefore capable of detecting only one type of wave.

A further drawback which is probably the most serious is that the blade-spring which supports the geophone has only one degree of freedom as determined in the direction of the arch of the spring. The structure of the spring and the application stresses developed do not permit flexibility of the spring in all directions. In consequence, there is no effective decoupling between the mass of the tool, the mass of the geophone and of the associated shoe. The mass of the tool is of very considerable value with respect to that of the geophone assembly and introduces a parasitic effect which is greater as the connection of the tool body with said geophone assembly has greater rigidity.

Another point worthy of note is that, by reason of the rigid connection between the mass of the tool and the geophone, the geophone whose mass is of low value with respect to that of the tool cannot usefully vibrate at the time of reception of high frequencies of the transmission spectrum. These high frequencies are thus eliminated and the general result thereby achieved is the same as if the tool body and the relative flexibilities of the bore-hole walls constituted a filter for these high frequencies.

The present invention which relates to the second type of measurement offers a satisfactory solution to the problem thus presented and makes it possible to overcome the disadvantages recalled in the foregoing.

SUMMARY OF THE INVENTION

This invention is accordingly directed to a measuring device for a seismic profile within a well-bore, of the type comprising transmission means placed at the ground surface and capable of delivering transmission signals having a frequency spectrum within the range of 5 to 500 Hz, a tool body placed within the well-bore and connected to the transmission means by a conductor cable, and at least one geophone mounted on elastic members which are connected to the tool body. Said geophone detects sound waves generated by said transmission signals after propagation within subsurface strata which exhibit natural elasticity at the level of the geophone. Means are provided for recording and processing the electric signals delivered by said geophone in response to the sound waves received. The connection between said geophone and the recording and processing means placed at the ground surface is provided through said cable.

The distinctive feature of the invention lies in the fact that the elastic members are constituted by means which are resilient in at least two directions and interposed between the geophone and application means connected to the tool body and intended to apply said geophone against the wall of the well-bore during each detection of said waves. A further distinctive feature lies in the fact that the elasticity of the resilient means is at least equal to the elasticity of the subsurface stratum traversed by the well-bore. In accordance with another characteristic feature, the resonance frequency of the mass of the geophone with the resilient means is equal at a maximum to the resonance frequency of said mass of the geophone and the elasticity of the subsurface stratum.

The connection of the geophone with the tool body by means which are resilient in two directions permits almost complete decoupling of the mass of the tool body with respect to that of the geophone and consequently makes it possible to eliminate practically all the parasitic effects introduced in the measurements by the mass of the tool body. Moreover, by virtue of the aforementioned elastic coupling, the geophone is capable of vibrating in the direction of the vibrational velocity of the wave which it receives.

In accordance with a further distinctive feature, the device comprises three orthogonal geophones in order to ensure equally effective detection of the vibrational velocities which propagate in the three directions of space.

In accordance with yet another distinctive feature of this invention, the body of the tool is applied against a wall of the bore-hole opposite to the wall against which the geophone is applied and comprises an articulated locking arm, said arm being also applied against the wall which receives the geophone.

BRIEF DESCRIPTION OF THE DRAWINGS

Other features of the invention will be more apparent upon consideration of the following description and accompanying drawings, wherein:

FIG. 1 is a schematic representation of the device in accordance with the present invention;

FIG. 2 is a partial and schematic representation of the spring system;

FIG. 3 is a view in elevation of the spring system of FIG. 2;

FIG. 4 is a partial and schematic representation of an elastic system formed by a block of elastomer;

DESCRIPTION OF THE PREFERRED EMBODIMENTS

Figure 5:
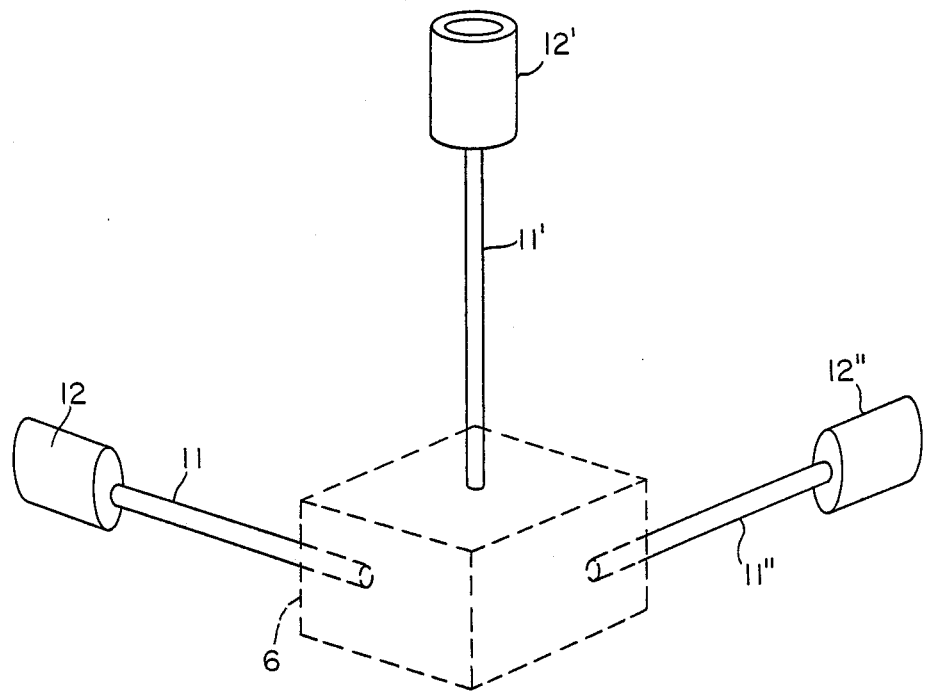
FIG. 5 is a perspective view showing orientation of geophones in three different directions.

The measuring device illustrated in FIG. 1 is intended to be lowered into a well-bore 1 delimited by its walls 2 and 3 and the ground surface 4. The well-bore 1 extends through subsurface strata which are not indicated in the drawings but which it is desired to analyze in order to determine some of their characteristics.

A block 5 placed on the ground surface 4 is a schematic representation of means for transmitting seismic energy associated with means for controlling and displacing a tool body 6 within the well-bore 1. The body 6 is suspended from a cable 7 within said well-bore 1.

A bearing arm 8 is mounted at the upper portion, for example, of the tool body 6 and is pivoted to a pin 9 carried by said body 6.

A geophone assembly 10 is mounted at one end of a rigid arm 11, the other end of which is attached to the tool body 6. The connection between the arm 11 and the tool body is so designed as to ensure that the geophone assembly 10 can be applied against the wall 2 at the time of measurement of the vibrational velocities to be detected and moved away from said wall 2 when the tool body 6 is displaced in order to bring this latter into another position within the well 1. The geophone assembly 10 produces electrical signals which are transmitted by the cable 7 to a means for receiving and processing 18. The means 18 is shown in FIG. 1 schematically as being connected to the cable 7 by a cable 19 via means 5, although any other working electrical connection between the means 18 and cable 7 is also contemplated as being within the scope of the present invention.

In a first embodiment shown in FIGS. 2 and 3, the geophone assembly 10 is constituted by a casing 12 in which are mounted at least three springs 13 to 15. Said springs are connected to a geophone 16 proper in order to permit vibration of this latter in all directions of propagation of vibrational velocities of the waves generated by the transmission means 5. In the example shown in FIG. 2, the geophone 16 is placed at the center of the casing 12 and is thrust against the wall 2 by the spring 15 whilst the springs 13 and 14 permit vibration of the geophone 12 in directions at right angles to those of the spring 15.

In a second embodiment shown in FIG. 4, the springs 13 to 15 are replaced by an elastomer block 17 placed within the casing 12. In this embodiment, the geophone 16 is housed partly within the elastomer block 17 in order to have a free face which can be applied against the bore-hole wall 2.

Furthermore, positional locking of the tool body 6 against the walls 2 and 3 of the bore-hole 1 makes it possible to release the cable 7 and therefore to decouple the tool body 6 with respect to the means 5 for positioning and transmission from the ground surface.

When all the measuring means are in position within the bore-hole, the surface transmission means 5 are excited in order to transmit a signal into the ground and therefore around the bore-hole, the frequency of said signal being within the range of 5 to 300 Hz. This electric signal gives rise to waves which propagate within the formation strata around the bore-hole 1. Each type of wave which is generated and reaches the geophone assembly 10 is detected by this latter in the form of a vibrational velocity. The vibrations of the geophone or geophones 16 in each direction are transmitted to the ground surface by the cable, recorded and then processed by suitable means which will not be described in detail.

In order that each geophone should be capable of vibrating satisfactorily in the direction of the detected vibrational velocity, the geophone must be mechanically decoupled from the tool body 6. However, the natural elasticity s of the bore-hole wall 2 introduces an elastic connection with the geophone or geophones 16. Since the elasticity S of the elastic means 13 to 15 or 17 produces action on said geophones, the result thus obtained is consequently an elastic system in equilibrium which is constituted by the body of the tool and the associated arms 8 and 11 having a total mass M, by the geophone assembly 16 having a mass m, by the elastic means 13, 15 or 17 interposed between the tool body 6 and the geophone assembly, and by the elasticity s of the rocks. In order to obtain good decoupling, it is accordingly necessary to determine an elasticity S which must be higher as the ratio of the mass M to the mass m is higher. Calculations show that, when S=s, the vibrational velocity of the geophone assembly is one-half that of the rocks. In this case, it is necessary to ensure that the resonance frequency of the mass m with the elasticity S is equal to that of the mass m with the elasticity s.

Postulating a resonance frequency F equal to 100 Hz, the deflection $\rho$ under load of the elastic means 13 to 15 is calculated from the formula $\rho = g/(F^2 4\pi^2)$ which is very little different from $1/(4F^2)$. Thus, when F=100 Hz, we obtain $\rho = 1/(4 \times 10^4) = 0.025$ mm.

Elastic means having this value of deflection can readily be formed of steel or of an elastic material such as neoprene.

As will be clearly understood, it is possible to adopt other ratios between S and s and other resonance frequencies provided that said frequencies are chosen within the spectrum of frequencies emitted by the transmission means, namely within the range of 5 to 3000 Hz.

In order to ensure that the velocity of the geophone is as close as possible to that of the rock and equal for example to 9/10 of this latter, the value S=9 s may be adopted. With a mass m equal to 0.1 kg, it is necessary to employ elastic means having a flexibility equal to 0.225 mm/Newton in respect of S=9 s.

FIG. 5 illustrates three geophones 12, 12 and 12" being supported at right angles to one another for reviewing signals in three different directions. The geophones are supported by respective members 11, 11, and 11", which in turn are supported by the means 6 (shown in dotted outline in FIG. 5).

As will readily be apparent, the invention is not limited in any sense to the embodiments of the example hereinabove described with reference to the accompanying drawings. Depending on the applications considered, many alternative forms of construction within the capacity of those versed in the art may accordingly be contemplated without thereby departing either from the scope or the spirit of the invention.

We claim:

1. A measuring device for a seismic profile of the subsurface strata traversed by a well-bore comprising:
   a transmission means placed at the ground surface and capable of delivering transmission signals having a frequency spectrum within the range of 5 to 500 Hz;
   a tool body disposed within the well;
   a conductor cable connecting said tool to said transmission means;
   resilient means connected to said tool body and having an elasticity S, said resilient means comprising a spring means which is flexible in three predetermined directions, each direction being at an angle with respect to the other directions;
   at least one geophone having a mass m mounted on said resilient means;
   said geophone being adapted for receiving acoustic waves generated by said transmission signals after propagation within subsurface strata having an elasticity s and for delivering electrical signals in response to received acoustic waves;
   recording and processing means disposed on the ground surface for recording and processing aid electrical signals and being connectable through said cable to said geophone;
   said resilient means supporting said at least one geophone and being capable of vibrating in at least two of said directions at angles with respect to each other so as to substantially decouple said at least one geophone from said tool body; and
   application means connected to said resilient means for displacing said geophone and resilient means for resiliently urging said geophone against a wall of the well-bore by said resilient means during each detection of said acoustic means;
   said mass m of said geophone and said elasticity S of said resilient means defining a first resonant frequency and said mass m of said geophone and said elasticity s of the subsurface strata defining a second resonant frequency, said first resonant frequency being at most equal to said second resonant frequency.

2. A measuring device as claimed in claim 1 wherein:
   said elasticity of said resilient means is at the maximum nine times the elasticity of the subsurface stratum traversed by the well-bore;
   so that said tool body vibrates at the time of reception of frequencies in the upper range of said frequency spectrum.

3. A device according to claim 1, wherein:
   said device comprises three of said geophones mounted at right angles with respect to each other in order to permit detection of said waves which propagate in the directions of said geophones.

4. A device according to claim 1, wherein said tool body is displaced off-center with respect to the central axis of the well-bore and comprises:
   a retractable arm having one end pivotally attached to said tool body and the other free end bearing on the side of the well-bore wall with which said at least one geophone is in contact; and
   said tool body having one face applied against another side of the wall of the well-bore.

5. A device according to claim 1 wherein:
   said resonance frequencies are within said range of said frequency spectrum.

6. A measuring device for a seismic profile of the subsurface strata traversed by a well-bore comprising:
   a transmission means placed at the ground surface and capable of delivering transmission signals having a frequency spectrum within the range of 5 to 500 Hz;
   a tool body disposed within the well-bore;
   a conductor cable connecting said tool body to said transmission means;
   resilient means connected to said tool body and having an elasticity S and comprising a casing and three springs mounted within said casing arranged at right angles with respect to each other;
   at least one geophone having a mass m mounted on said three springs;
   said geophone being adapted for receving acoustic waves generated by said transmission signals after propagation within subsurface strata having an elasticity s and for delivering electrical signals in response to said received acoustic waves;
   recording and processing means disposed on the ground surface for recording and processing said electrical signals and being connectable through said cable to said geophone;
   said resilient means supporting said at least one geophone and being capable of vibrating in the three right-angle directions of said springs for substantially decoupling said at least one geophone from said tool body; and
   a rigid arm connecting said casing to said tool body for displacing said geophone and resilient means for resiliently urging said geophone against a wall of the well-bore by said springs during each detection of said acoustic means;
   said mass m of said geophone and said electricity S of said resilient means defining a first resonant frequency and said mass m of said geophone and said elasticity s of the subsurface strata defining a second resonant frequency, said first resonant frequency being at most equal to said second resonant frequency.

7. A device according to claim 6, wherein:
   said device comprises three of said geophones mounted at right angles with respect to each other in order to permit detection of said waves which propagate in the directions of said geophones.

8. A device according to claim 7, wherein said tool body is displaced off-center with respect to the central axis of the well-bore and comprises:
   a retractable arm having one end pivotally attached to said tool body and the other free end bearing on the side of the well-bore wall within which said at least one geophone is in contact; and
   said tool body having one face applied against another side of the wall of the well-bore.

9. A device according to claim 8 wherein:
   said resonance frequencies are within said range of said frequency spectrum.

10. A device according to claim 6, wherein said tool body is displaced off-center with respect to the central axis of the well-bore and comprises:
    a retractable arm having one end pivotally attached to said tool body and the other free end bearing on the side of the well-bore wall within which said at least one geophone is in contact; and
    said tool body having one face applied against another side of the wall of the well-bore.

11. A device according to claim 6 wherein:
    said resonance frequencies are within said range of said frequency spectrum.

* * * * *